Feb. 26, 1952 H. W. LIND 2,587,343
POWER DRIVE
Filed Jan. 2, 1948 3 Sheets-Sheet 1

INVENTOR.
HARRY W. LIND
BY
McCANNA AND MORSBACH
ATTYS.

Feb. 26, 1952  H. W. LIND  2,587,343
POWER DRIVE
Filed Jan. 2, 1948  3 Sheets-Sheet 2

INVENTOR.
HARRY W. LIND
BY
McCANNA AND MORSBACH
ATTYS.

Feb. 26, 1952     H. W. LIND     2,587,343
POWER DRIVE
Filed Jan. 2, 1948     3 Sheets—Sheet 3
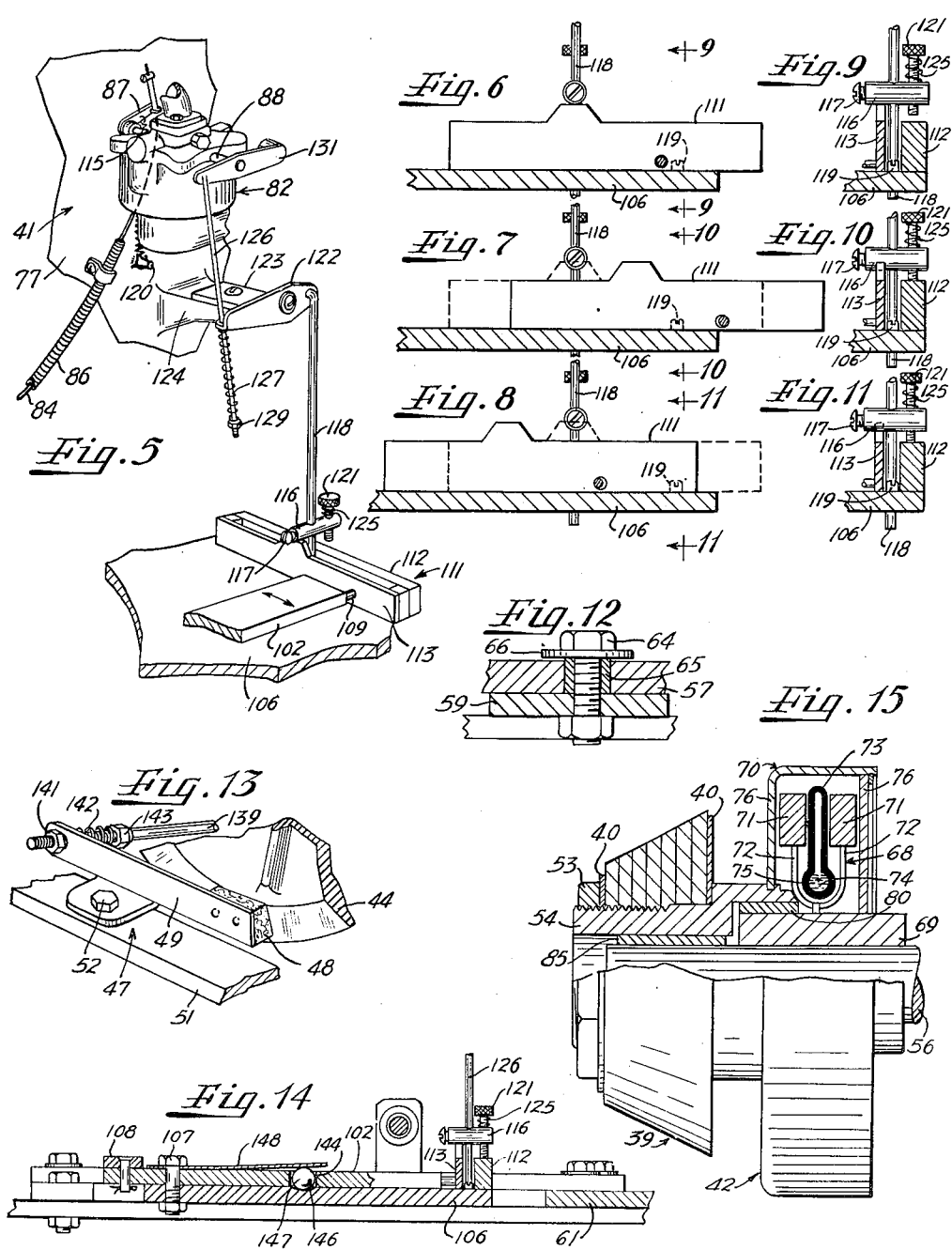
INVENTOR.
HARRY W. LIND
BY
McCANNA AND MORSBACH
ATTYS.

Patented Feb. 26, 1952

2,587,343

UNITED STATES PATENT OFFICE 2,587,343

POWER DRIVE

Harry W. Lind, Rockford, Ill.

Application January 2, 1948, Serial No. 149

9 Claims. (Cl. 192—.096)

This invention relates to drive mechanisms of the type in which a relatively small power source acts to start a heavy load at a smooth rate without stalling.

A primary object of the invention is the provision in a drive mechanism of the above character of novel means disposed between the power source and the load for transmitting the power of the former to the latter in a manner to obtain a smooth acceleration of the load to a pre-set speed.

Another object of the invention is the provision in a drive mechanism of the above character of novel means disposed between the source of power and the load for transmitting the power of the former to the latter and a control means therefor whereby the direction of movement of the load may be reversed from movement in one direction at a pre-set speed to movement in a reverse direction at the same pre-set speed substantially instantaneously without stalling or imparting a shock to the prime mover.

Another object of the invention is the provision in a drive mechanism of the above character of novel means for pre-controlling the respective components of the drive mechanism so that a connected load may be driven in a desired direction of movement, at a pre-set speed, through the manipulation of a single means.

Another object of the invention is to provide a drive mechanism of the above character having a prime mover with a speed adjusting mechanism with a novel linkage connected to the speed adjusting mechanism for automatically controlling the acceleration of the prime mover in a predetermined manner.

Another object of the invention is to provide a drive mechanism of the above character having a brake with a novel linkage for controlling the release and application of the brake.

Another object of the invention is to provide a drive mechanism of the above character having a pivotally mounted driving means with a novel linkage for controlling the position of the driving means.

A specific object of the invention is to provide a drive mechanism of the above character having a driving means engageable with a driven means, a prime mover for driving the driving means, and a brake for controlling the movement of the driven means with novel means for simultaneously controlling the functions of these respective components.

Another object of the invention is to provide a drive mechanism of the above character having a control means with novel means for indicating the neutral position of the drive mechanism.

Other objects and advantages of the invention will become apparent from the following detailed description taken in connection with the accompanying drawings, in which—

Fig. 5 is a perspective view showing a linkage mechanism for throttling the prime mover;

Figs. 6, 7 and 8 are sectional views taken substantially along the lines 6—6 of Fig. 2 with the parts in a different position;

Figs. 9, 10 and 11 are end views respectively of Figs. 6, 7 and 8, respectively, taken along the sections indicated;

Fig. 12 is a sectional view taken along the line 12—12 of Fig. 2;

Fig. 13 is a perspective view of the brake utilized in restraining the movement of the drive mechanism;

Fig. 14 is a sectional view taken substantially along the line 10—10 of Fig. 2; and Fig. 15 is a sectional view taken substantially along the line 15—15 of Fig. 3.

Figures 1, 2:
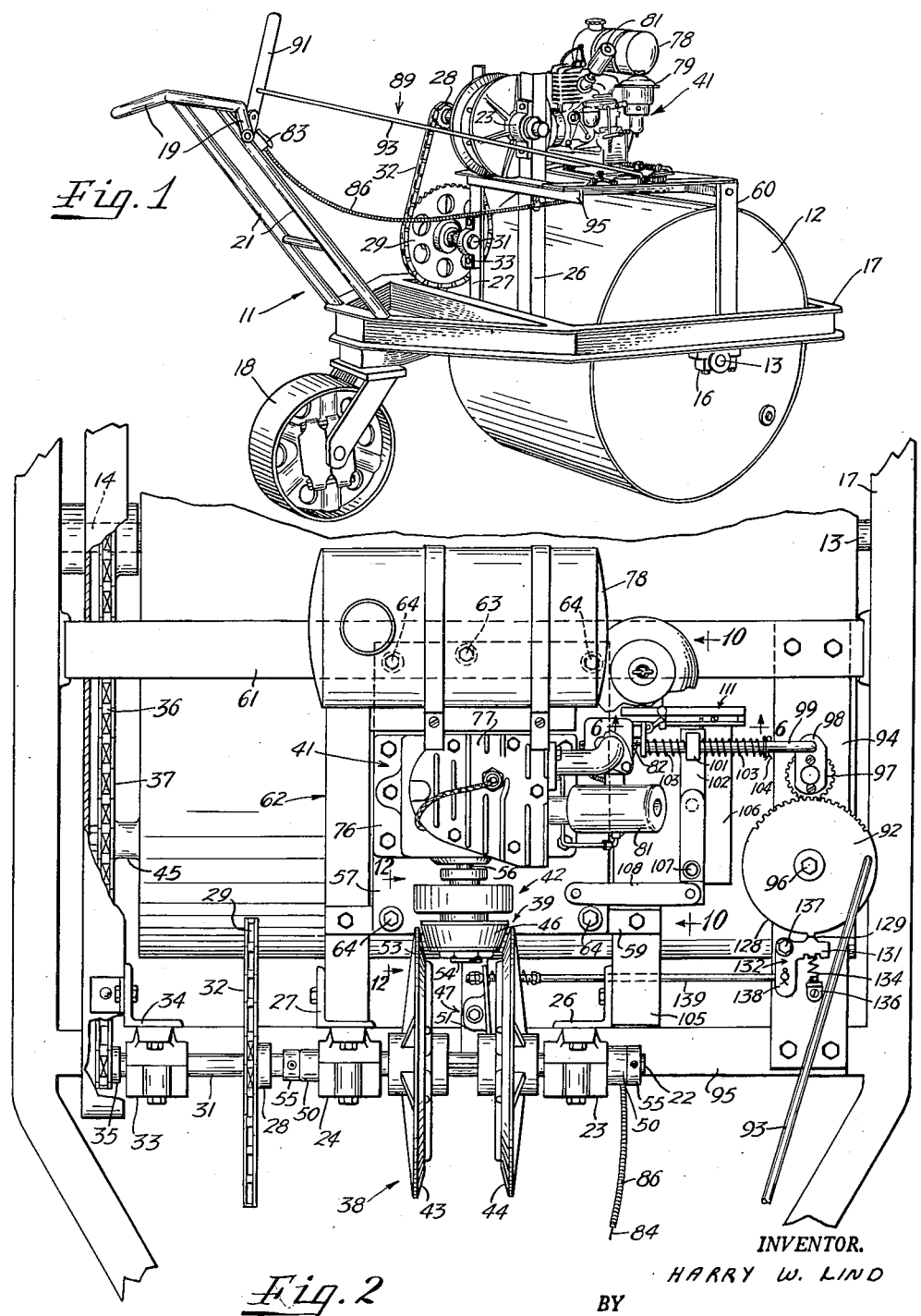
Figure 1 is a perspective view of a roller embodying the present invention.
Fig. 2 is a fragmentary plan view of the roller.

Referring now to the drawings, the invention is shown embodied in a drive mechanism for a lawn or landscaping roller 11. It is to be understood that this embodiment of the invention is by way of illustration only and that this drive mechanism can be utilized with any driven auxiliary and particularly one having a high inertia. Herein the roller 11 comprises a relatively large drum 12 of the type adapted to be filled with water or other fluid and having a smooth external surface. The drum 12 is formed on opposite ends with trunnions 13 and 14 (see Figures 1 and 2) shaped to be received in bearings 16 (one only being shown) mounted on opposite sides of a frame 17. The frame may be of any suitable construction. In this instance the latter is formed by channel shaped members secured together as by welding. At its rearward edge the frame 17 is supported by a caster wheel 18 pivotally mounted thereto. To steer the roller 11, handles 19 are secured to inclined supports 21 rigidly attached to the rear edge of the frame 17.

The roller 11 is propelled by the drive mechanism through a suitable speed reduction unit. As shown in Figures 1 and 2 the drive mechanism effects rotation of a horizontally extending shaft 22 supported by spaced bearings 23 and 24 secured to uprights 26 and 27, respectively, rigidly attached to the frame 17. A small sprocket wheel 28 mounted on the shaft 22 at one side of the roller 11 is connected to a large sprocket wheel 29 mounted on a shaft 31, immediately below the shaft 22, through a chain 32. The shaft 31 is suitably journaled by bearings 33 mounted respectively on the upright 27 and a bracket 34 secured to the frame 17. A second sprocket wheel 35 mounted on the shaft 31 in spaced relation to the sprocket wheel 28 is drivingly connected to a large sprocket wheel 36, rigid with the drum 12, through a chain 37. The sprocket wheel 36 is centered with the trunnion 14 and is fastened to the respective end of the drum as by bolts screwed into bosses 45 formed integral with the drum 12 and spacing the sprocket wheel 36 therefrom, as shown in Fig. 2.

Figure 3:
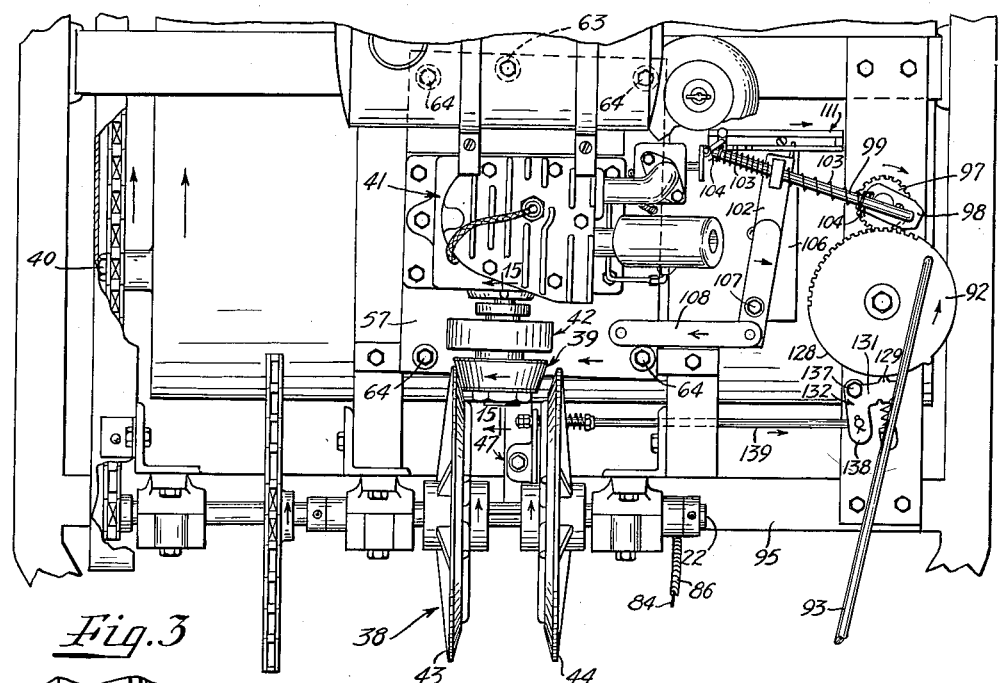
Fig. 3 is a view similar to Fig. 2 with the component parts in a different position.
Figure 4:
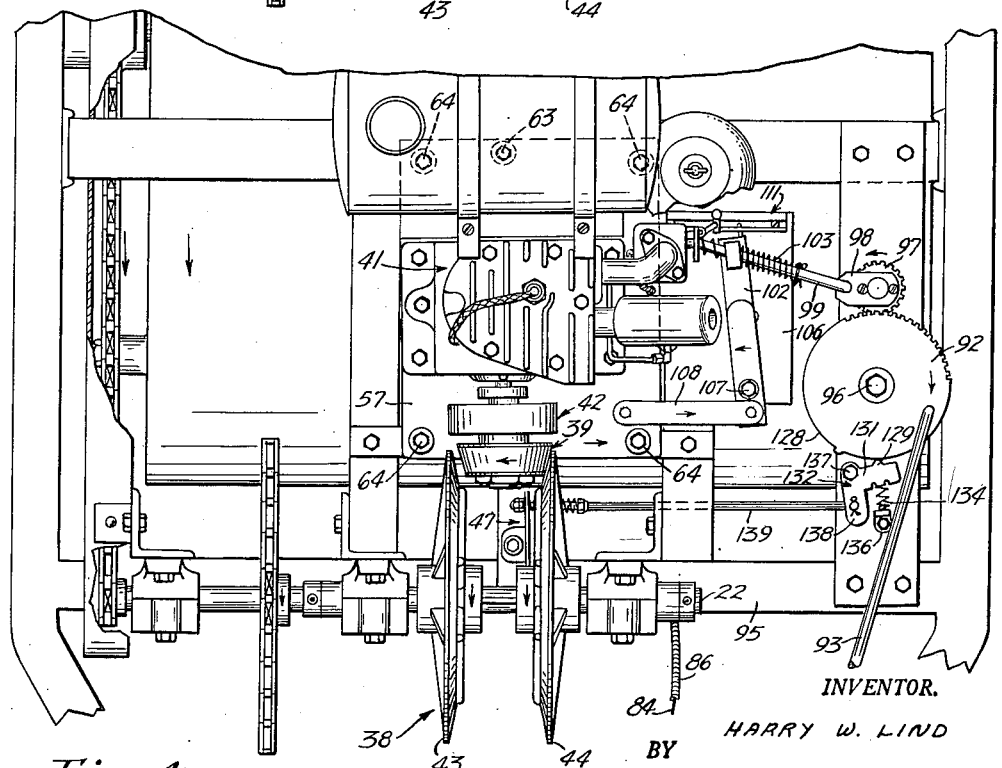
Fig. 4 is similar to Fig. 2 with the parts in still a different position.

In general, the drive mechanism comprises a driven means 38, a drive means 39 engageable with said driven means to impart motion of the latter to the former, a prime mover 41 for supplying power to the drive means and a speed responsive clutch 42 connected between the prime mover 41 and the driving means 39. In the present instance the driven means 38 comprises bevel discs 43 and 44 securely mounted on the shaft 22 in spaced relation so that the respective beveled portions of the discs face each other. Preferably the discs 43 and 44 are formed from light weight materials so that a minimum of power is lost in rotating the respective discs. Bearings 50 are mounted on the shaft 22 adjacent the bearings 23 and 24 respectively to assume the thrust load of the discs. The bearings 50 are secured in position by collars 55 secured to the shaft 22 as by set screws. The driving means 39, as shown, is in the form of a cone mounted at substantially right angles to the axis of rotation of the discs 43 and 44 and having a friction surface 46 arranged to engage one or the other of the spaced discs 43 and 44, depending on the desired direction of movement of the roller 11. The cone 39 is also mounted so that it can assume a neutral point between the discs 43 and 44. When the cone 39 frictionally engages the disc 43 as shown in Fig. 3 the roller 11 moves in a forward direction and when the cone 39 frictionally engages the disc 44 as shown in Fig. 4 the roller moves in a rearward direction.

To restrain movement of the load or roller 11, a brake 47 is provided. In the present instance, the brake 47 (see Fig. 13) is formed by a friction block 48 rigidly mounted as by rivets on one end of a lever 49. The latter is secured to a cross piece 51 by a bolt 52 which also forms a fulcrum about which the lever is movable. The lever 49 is mounted adjacent the disc 44 so that force applied to the end of the lever opposite the friction block 48 causes the latter to engage the side of the disc 44.

While any suitable mounting means may be used for effecting frictional engagement between the cone 39 and the respective bevel discs 43 and 44, I prefer to mount the cone 39, the speed responsive device 42, and the prime mover 41 as a unitary compact assembly and then mount the entire assembly so that it is rotatable about a vertical axis to permit engagement of the cone 39 with the respective discs 43 and 44. To this end the cone 39 (see Figs. 2, 3, 4 and 15) comprising a plurality of impregnated fibre discs mounted in side by side axial relation between spaced discs 40, is secured as by a nut 53 to the outer end of a sleeve 54 forming a part of the speed responsive device 42. The latter is connected to a drive shaft 56 of the prime mover 41. It will be seen that in this manner the speed responsive clutch 42 and cone 39 project outwardly from the prime mover 41 in a cantilever fashion. The prime mover is securely mounted to a support herein in the form of a plate 57 as by bolts. The plate rests on spaced cross pieces 59 and 61 of a platform 62, overlying the drum 12 and supported on the frame 17 in a suitable manner (see Figure 1) as by uprights 26, 27 and 60 (only one upright 60 being shown). The plate 57 is mounted so as to be rotatable about a vertical axis on the platform 62. In the present embodiment of the invention, the vertical axis is determined by a bolt 63 extending through the forward edge of the plate 57 and the cross piece 61 at a position substantially in axial alinement with the axis of the cone 39. At its front and rear edges the plate 57 (see Fig. 12) is formed with spaced apertures 65 for the reception of bolts 64 extending through the plate 57 and the cross piece 61 and the plate 57 and the cross piece 59 respectively. It is to be understood that the bolts 64 are sufficiently tight to maintain the plate 57 in position on the platform 62 and prevent excessive vibration while at the same time permitting rotational sliding movement of the plate 57 on the platform 62. The slots 65 are dimensioned to permit the required movement of the plate 57 about the vertical axis to effect frictional engagement of the cone 39 with discs 43 and 44. Where desired, washers 66 may be disposed between the heads of the bolts 64 and the plate 57.

The speed responsive clutch 42 herein is in the form of a mercury clutch (see Fig. 15). The latter comprises a driving member 68 mounted on the prime mover drive shaft 56 by a sleeve 69 secured thereto as by a set screw, and a driven member 70 having the sleeve 54 upon which the cone 39 is supported. The driving member 68 consists of two friction plates 71 mounted on flexible discs 72 and a rubber gland 73 containing a small quantity of mercury 74, which when the unit is at rest occupies an annular shaped cavity 75 in the gland adjacent the sleeve 69. When the unit is in operation the mercury is urged outwardly by centrifugal force thus spreading the rubber gland 73 axially and forcing the friction plates 71 against the spaced members 76 connected together at their peripheries to enclose the driving member 68 and forming a part of the driven member 70. A suitable bushing 80 is disposed between the sleeve 69 and the driven member as shown in Fig. 15. A second bushing 85 is disposed between the sleeve 54 of driven member 70 and the shaft 56 to take the thrust when the cone 39 engages one of the discs 43 and 44. It is to be understood that the torque developed between the friction plates 71 and the spaced members 76 is proportional to the pressure supplied by the mercury, and this pressure, being centrifugally generated, varies as the square of the prime mover speed. It is evident, therefore, that if the load is great enough to pull down the prime mover speed excessively, the pressure on the clutch plates lessens, relieving the load on the prime mover and permitting it to operate at an efficient speed. The prime mover cannot be stalled. It is to be understood also that when the prime mover is first started, no load whatsoever is applied to it, until after the prime mover has reached a preselected speed due to the inertia delay of the actuating mercury.

Although any suitable prime mover 41 may be used to supply power for my drive mechanism I prefer to use a small conventional single cylinder gasoline engine. In this instance the latter comprises the drive shaft 56, a base 76 for mounting the unit, a block 77, a gasoline supply tank 78 mounted at the top of the engine so as to provide gravity flow of gasoline, an oil filter 79, an exhaust muffler 81 and a carburetor 82 for controlling the flow and mixture of gasoline to the engine. Manual throttling of the engine may be effected by a lever 83 (see Figure 1) mounted on the handle support 21 through a suitable cable 84 supported in a flexible tube 86 and attached in a suitable manner at one end to the lever 83 and at its opposite end to a gas mixture adjustment lever 87 (see Fig. 5) rigidly fastened to a shaft 88 on the carburetor 82.

Remote control means readily accessible to the operator of the roller is provided for preconditioning the components of the drive mechanism in a predetermined manner so that the roller 11 is movable either forward or backward with a smooth acceleration to a pre-set speed, or can be placed in an inoperative position. It is to be understood that if it is desired to speed up the unit during operation thereof, such as for example if the roller should be guided up a small incline or encounter some loose dirt, the unit may be accelerated by manipulation of the manual throttle control lever 83 independently of the control means hereinafter described. The control means comprises an actuator 89 having a plurality of operating positions interconnected with linkages respectively connected to the throttle or speed adjustment device 82, the support 57, and the brake 47 so that operation of the actuator simultaneously controls the acceleration of the prime mover 41, the position of the cone 39 and the actuation of the brake 47 respectively. In one position of the actuator 89 and linkages, preferably indicated as a neutral position, the prime mover 41 runs at an idling speed, the brake is set to restrain movement of the disc 44 and the cone 39 is disposed intermediate the discs 43 and 44: in another position of the actuator 89 and linkages preferably indicated as a forward position, the brake 47 is released, the prime mover 41 is accelerated to a pre-set speed and the rotation of the respective parts of the drive mechanism is such as to cause the roller 11 to move forward: in still another position of the actuator 89 and linkages preferably indicated as a reverse position, the brake 47 is released, the prime mover 41 is accelerated to a pre-set speed, and the rotation of the respective parts of the drive mechanism is such as to cause the roller 11 to move in a reverse direction.

In this embodiment of the invention the actuator 89 comprises a conveniently accessible lever 91 pivotally mounted on the handle support 21 and connected to a gear member 92 through an elongated rod 93. The gear member 92 is rotatably mounted on a cross piece 94, supported on the cross member 61 and a bracket 95 secured to the uprights 26 and 27, by a bolt 96 extending through a central opening in the gear member 92 and the cross member 94. The rod 93 is pivotally connected to the lever 91, intermediate the latter's ends and pivotally engages the gear member 92 adjacent its outer periphery. The pivotal connections are such that when the lever 91 is pushed forward as seen in Fig. 3 the gear rotates in a counterclockwise direction and when the lever 91 is pulled backward as seen in Fig. 4 the gear 92 rotates in a clockwise direction.

Rotation of the gear 92 controls movement of the plate 57 through a linkage or link work connected to the rear edge of the plate 57 to effect rotation of the latter about the vertical axis 63 so as to shift the cone 39 arcuately between the discs 43 and 44. Thus, as the gear 92 rotates it meshes with a spur gear 97 suitably mounted on the cross member 94 adjacent the gear wheel 92 and having an eccentric 98. The eccentric 98 pivotally engages one end of a rod 99, the opposite end of which extends through an opening in a boss 101 at one end of a lever 102. Sufficient clearance should be provided between the side walls of the opening and the rod 99 to permit relative angular movement between the lever 102 and the rod 99. In this instance a driving connection between the rod 99 and the lever 102 is effected through springs 103 disposed on opposite sides of the boss 101 and between abutments on the rod 99 in the form of cotter pins 104. The rod 99 on the eccentric 98 and the springs 103 are so arranged that when the eccentric 98 is rotated a predetermined distance the pivotal connection between the rod 99 and the eccentric goes over-center. Herein the overcenter position is determined by a line between the connection of the rod 99 and the lever 102 and the axis of the gear 97. This overcenter action of the respective parts is advantageous from an operating standpoint because it positively maintains the cone 39 in engagement with the respective disc 43 or 44 the pivotal connection between the rod 99 and the eccentric 98 goes overcenter. The lever 102 is secured to a bracket 106, rigid with a cross piece 105 of the platform 62, by a bolt 107 which also forms a fulcrum point for the lever 102. At its opposite end the lever 102 is connected to the plate 57 by a link 108 pivotally connected to the lever 102 and the rear edge of the plate 57. It is to be understood that angular movement of the lever 102 about its fulcrum 107 causes the plate 57 to swing about the vertical axis 63 and in turn to effect engagement of the cone 39 with one of the discs 43 and 44.

The acceleration of the prime mover 41 is controlled by a linkage mechanism or linkwork disposed between the gear wheel 92 and the carburetor 82. To simplify the construction of the carburetor control, the toggle mechanism of the linkage for controlling the position of the plate 57 is utilized in the linkage for controlling the throttling of the prime mover 41. Accordingly, the lever 102 is formed at one end with a pin 109 (see Fig. 5) which engages a slide 111 through an opening formed therein. The opening is sufficiently large to permit relative angular movement between the slide 111 and the lever 102. As shown the slide 111 comprises spaced members 112 and 113 interconnected at opposite ends and shaped to slide back and forth relative to the bracket 106 upon which it rests in response to movement of the lever 102. The member 113, as best seen in Figs. 6, 7 and 8 is formed with a cam surface adapted to engage a follower 116 formed by a cross member secured as by a screw 117 to one end of a vertically extending rod 118. By this construction the position of the cross piece 116 relative to the rod 118 may be adjusted. The extreme lower end of the rod 118 is disposed between the spaced plates 112 and 113 and extends through an aperture formed in the bracket 106. The clearance between the side walls of the aperture and the rod 118 is such as to permit only longitudinal axial movement of the rod 118. In spaced relation with the aperture is a head of a screw 119 threaded into the bracket 106 and disposed between the spaced members 112 and 113. This construction positively positions and guides the slide 111 during its respective movement so that the cam 113 is enabled to engage the follower 116. The cam 113 is formed with an intermediate raised portion which corresponds to the neutral position and with the follower 116 engaging the raised portion the prime mover operates at an idling speed. When the follower 116 engages the cam 113 on either side of the raised portion the prime mover operates at a pre-set accelerated speed. A spring 115 stretched between a boss 120 on the block 77 and the lever 87 positively assures engagement of the follower 116 with the slide 111. An adjustment screw 121 threaded through the cross member 116 and engageable with the spaced member 112 provides an additional means for adjusting the position of the follower 116. Thus, by adjusting the screw 121 so that the end thereof engages the member 112 it will be seen that the initial vertical position of the rod 118 can be varied. Through this screw it is possible to finely adjust the speed of the prime mover 41 to a predetermined value. When the screw engages the member 112 it is to be understood that the screw in effect becomes the cam follower since the cross piece 116 is raised as seen in Figs. 7 and 8 and only contacts the raised portion on the member 113. A spring 125 disposed between the head of the screw 121 and the cross member 116 prevents displacement of the screw through vibration of the engine parts.

At its upper end the rod 118 pivotally engages one end of a lever 122 pivotally mounted on a bracket 123 secured to a boss 124 on the prime mover 41 beneath the carburetor 82. The opposite end of the lever 122 is provided with an aperture through which extends the lower end of a vertically extending rod 126. A connection is effected between the lever 122 and the rod 126 by a spring 127. In this instance the spring 127 is disposed between the lower side of the lever 122 and a nut 129 threaded on to the extreme lower end of the rod 126. The upper end of the rod 126 pivotally engages a counterbalanced adjustment lever 131 rigidly mounted on the shaft 88. It is to be understood that the rotation of the shaft 88 may be controlled either by the manually adjustable throttling lever 83 or through the linkage just described. When controlled by the manual lever 83 any desired acceleration of the prime mover may be obtained by manipulating the handle 83. When the throttle is controlled through the linkage, the carburetor is automatically adjusted so that the prime mover is accelerated from idling speed to a pre-set speed. It will be observed that with the spring 127 disposed as herein described, manual control through lever 83 of the carburetor 82 is independent of the linkage mechanism, since the spring 127 also serves as a yield member.

As shown in the drawings, the brake 47 is also controlled through a linkage mechanism actuated by a rotation of the gear member 92. To this end the gear member 92 is formed with a cam surface 128 shaped to engage a follower 129 herein in the form of a projection formed on an arm 131 of a bell crank 132. A spring 134 disposed between the arm 131 and an abutment 136 secured to the cross piece 94 positively holds the projection 129 in engagement with the gear member 92 and the cam surface 128 thereon. The bell crank 132 is secured to the cross piece 94 by a bolt 137 which forms the pivotal axis of the bell crank 132. An arm 138 of the bell crank 132 is connected to the brake lever 49 through a link 139. The link 139 extends through an opening in the lever 49 and is threaded on its outer end for the reception of a nut 141. The brake 47 may be adjusted by adjusting the position of the nut 141 on the link. A driving connection between the parts is effected in one direction of movement of the link by the nut 141 (see Fig. 13) engaging the lever 49 and in its other direction of movement through a spring 142 disposed between the lever 49 and an abutment 143 mounted on the link 139. It will be observed that the cam surface 128 is shaped so that in a neutral position of the actuator 89 the follower 129 engages the high point of the cam surface to apply the brake and in either the forward or the reverse position of the actuator 89 the follower engages the low surface on either side of the raised portion of the cam surface 128 to release the brake.

Any suitable means may be used to indicate the neutral position of the actuator 89. For this purpose I form the lever 102 (see Fig. 14) with an aperture 144 and the bracket 106 with a recess 146, which in one position of the lever 102 is in register with the aperture 144, and then dispose a ball 147 in the opening of the lever 144. The ball 147 is secured in position by a leaf spring 148 secured to the lever 102 and having one end overlying the aperture 144. When the opening 144 and the recess 146 are in register the ball 147 will be forced in the recess by the action of the spring 148. The tendency of the ball 147 to be forced into the recess 146 can be readily felt by the operator through the respective linkages and thereby indicate to the operator that the latter are in the neutral position.

The operation of this drive mechanism and the control thereof is readily apparent from the foregoing but is briefly summarized as follows. Before using the roller 11 the lever 91 is placed in the neutral position. With the lever 91 in this position the brake 47 engages the disc 44 to restrain movement thereof, and the cone 39 is disposed at an intermediate position between the discs 43 and 44. The gasoline engine is then started. Assuming it is desired to run the roller in a forward direction the lever 91 will be moved to its forward direction. The gear wheel 92 is rotated as shown in Fig. 3 so that the eccentric 98 rotates in a clockwise direction. This causes the lever 102 to be moved clockwise through the left hand spring 103 mounted on the rod 99. Movement of the lever in this direction causes the link 108 to move to the left as shown by the arrows. As a consequence, the table 57 rotates in a clockwise direction about the pivotal axis 63 to effect engagement of the cone 39 with the disc 43. The shaft 22 is caused to rotate in a direction that drives the roller 11 through the speed reduction unit in a forward direction. Simultaneously with the movement of the eccentric 98 in a clockwise direction the projection 129 on the bell crank arm engages the lower surface on the cam 128. This causes the bell crank 132 to pivot about the bolt 137 and move the arm 138 to the right in a counterclockwise direction. This movement causes the nut 141 mounted on the link 139 to engage the lever 49 and rotate the latter so as to disengage the friction block 48 from the disc 44. Assuming that the carburetor has been adjusted for a predetermined acceleration of the prime mover, rotation of the lever 102 in a clockwise direction causes the slide 111 to be moved to the right as shown in Fig. 3. The follower 116 disengages the raised portion of the cam 113 and the end of the screw 121 engages the member 112 as shown. It is to be understood that by adjusting the screw 121 any desired acceleration of the prime mover, within the range of operation, may be obtained. Preferably the acceleration should be such that when the lever 91 is thrown in the forward direction the speed of the roller 11 is approximately equal to the speed at which an operator is capable of walking behind the roller.

When the lever 91 is moved to a reverse position as shown in Fig. 4, the gear 92 is moved in a clockwise direction. The eccentric 98 rotates in a counterclockwise direction. This movement causes the lever 102 to be moved in a counterclockwise direction about its fulcrum 107. In this intance the lever is driven through the spring 103 on the right hand side of the boss 101. Counterclockwise movement of the lever 102 causes the link 108 to be moved to the right as shown in Fig. 4, and the plate 57 rotates about its pivotal axis 63 in a counterclockwise direction so as to effect engagement of the cone 39 with the disc 44. Through this engagement of the cone with the disc 44, the roller 11 will be propelled in a backward or reverse direction of movement. The operation of the throttle linkage is substantially the same as that described above for when the lever 91 is set in a forward position except that the slide 11 moves to the left as shown in Fig. 4. The operation of the brake linkage is the same as that described for when the lever 91 is set in a forward position.

It is to be understood that the lever 91 may be moved from the forward position to the reverse position as rapidly as the lever 91 can be moved without stalling the prime mover since throttling of the prime mover 41 is controlled simultaneously with the shift of the cone 39 between the discs 43 and 44 and because the speed responsive clutch 42, which assumes the load shock under the above conditions, is disposed between the cone 39 and the prime mover 41.

I claim:

1. In a driving mechanism, the combination of, a shaft, spaced discs mounted on said shaft, a cone engageable alternately with said spaced discs to control the direction of rotation of said shaft, a prime mover for driving said cone and having an accelerator, supporting means for said prime mover, means for mounting said supporting means so that said cone is movable between the respective discs to effect frictional engagement therewith, first linkage means for controlling the position of said supporting means, second linkage means engageable with said throttle for controlling the acceleration of said prime mover in a predetermined manner, a brake engageable with one of said spaced discs for arresting movement thereof, third linkage means for controlling said brake, and means for simultaneously controlling the first, second and third linkage means and having a plurality of positions whereby in one position of said controlling means said cone engages one of said discs to effect rotation of said shaft in one direction of rotation at a predetermined speed, in a second position, said cone engages said other disc to effect rotation of said shaft in the opposite direction of rotation at the predetermined speed and in a third position said cone is disposed intermediate said discs and said brake is applied to restrain movement of said shaft.

2. In a driving mechanism, the combination of, a shaft, spaced discs mounted on said shaft, a cone selectively engageable with said spaced discs to effect rotation of said shaft in opposite directions, a prime mover for driving said cone and having a throttle, first linkage means connected to said throttle for controlling the acceleration of said prime mover in a predetermined manner, a brake lever engageable with one of said spaced discs for restraining the rotation thereof, second linkage means for controlling the position of said brake lever, and means for simultaneously controlling the position of the first and second linkage means.

3. In a driving mechanism, the combination of, a shaft, spaced discs mounted on said shaft, a cone selectively engageable with said spaced discs to effect rotation of said shaft in opposite directions, a prime mover for driving said cone, support means for said prime mover, means for mounting said support means so that said cone is movable between the respective spaced discs to effect frictional engagement therewith, first linkage means for controlling the position of said support means, a brake engageable with one of said spaced discs for restraining the rotation thereof, second linkage means for controlling the position of said brake, and means for simultaneously controlling the first and second linkages means whereby to effect movement of said shaft in a predetermined direction of rotation.

4. In a driving mechanism, the combination of, driven means, driving means engageable with said driven means for imparting motion thereto, a prime mover for propelling said driving means and having a throttle, a linkage for effecting control of said throttle comprising, an overcenter toggle element, a slidable cam the position of which is controlled by said toggle element, a follower engageable with said cam, a rod rigidly connected to said follower, a pivotally mounted lever connected at one end to said rod and operable in response to movement of said rod, a second rod connected to the opposite end of said lever and pivotally connected to said throttle and a spring connection between said lever and said second rod, means for effecting engagement and disengagement of the driving and driven means, and means for simultaneously actuating said linkage and said means for effecting engagement and disengagement of the driving and driven means whereby to effect a desired movement of the driven means at a predetermined speed.

5. In a driving mechanism, the combination of, driven means including a friction surface, driving means engageable with said driven means for imparting motion thereto, a prime mover for propelling said driving means and having a throttle, means engageable with said throttle for automatically accelerating the prime mover to a pre-set speed, a brake for restraining movement of said mechanism comprising a friction block engageable with said friction surface and a pivotally mounted lever for supporting said friction block, a linkage for controlling the brake comprising a bell crank having one arm formed with a cam follower and another arm at an angle to said first arm, a rod pivotally connecting said second arm on the bell crank and the lever, means for controlling the engagement of said driving and driven means, and an actuator for simultaneously controlling the throttling means, the means for effecting engagement and disengagement of the driving means with the driven means, and the brake, said actuator including a cam surface shaped to engage the follower, said cam surface in one position effecting engagement of the friction block with the friction surface and at position on either side of said first position disengaging said friction block and said friction surface.

6. In a driving mechanism, the combination of, driven means, driving means engageable with said driven means, including a prime mover having a throttle, support means for mounting said driving means, linkage means for controlling said throttle to accelerate said prime mover to a pre-set speed, linkage means engageable with said support means for moving the latter to effect engagement and disengagement of the driving means with the driven means comprising, a toggle mechanism, a pivotally mounted lever connected at one end to said toggle mechanism, a link pivotally connected to the opposite end of the lever and the support means, and means for simultaneously actuating said throttling means and the linkage whereby said support means moves in a predetermined manner to effect engagement of the driving and the driven means, and the prime mover automatically accelerates to the pre-set speed.

7. In a driving mechanism, the combination of, a shaft, first spaced discs mounted on said shaft, a cone engageable alternately with said discs to control the direction of rotation of said shaft, a prime mover for driving said cone and having a throttle, a speed responsive clutch disposed between the prime mover and the cone, supporting means for said prime mover, means for mounting said supporting means so that said cone is movable between the respective discs to effect frictional engagement therewith, first linkage means for controlling the position of said supporting means, second linkage means engageable with said throttle for controlling the acceleration of said prime mover in a predetermined manner, a brake engageable with one of said spaced discs for arresting movement thereof, third linkage means for controlling said brake, and a single lever for simultaneously controlling the first, second and third linkage means and having a plurality of operating positions, said lever in one position effecting engagement of said cone with one of said discs to rotate said shaft in one direction of rotation at a predetermined speed; said lever in a second position effecting engagement of said cone with said other disc to effect rotation of said shaft in the opposite direction of rotation at the predetermined speed; and said lever in a third position positioning said cone intermediate said discs and effecting engagement of said brake with said disc to restrain movement of said shaft.

8. In a driving mechanism, the combination of, a shaft, first spaced discs mounted on said shaft, a cone engageable alternately with said discs to control the direction of rotation of said shaft, a prime mover for driving said cone and having a throttle, a speed responsive clutch disposed between the prime mover and the cone, supporting means for said prime mover, means for mounting said supporting means so that said cone is movable between the respective discs to effect frictional engagement therewith, first linkage means for controlling the position of said supporting means, second linkage means engageable with said throttle for controlling the acceleration of said prime mover in a predetermined manner, a brake engageable with one of said spaced discs for arresting movement thereof, third linkage means for controlling said brake, a single lever means for simultaneously controlling the first, second and third linkage means and having a plurality of operating positions, said lever means in one position effecting engagement of said cone with one of said discs to effect rotation of said shaft in one direction of rotation at a predetermined speed; said lever means in a second position effecting engagement of said cone engages said other disc to effect rotation of said shaft in the opposite direction of rotation at the predetermined speed; and, said lever means in a third position positioning said cone intermediate said discs and applying said brake to restrain movement of said shaft, and means for determining the third position of said lever means.

9. In a driving mechanism, the combination of a shaft, spaced driven means, driving means, means for mounting said driving means to engage one of said driven means to effect clockwise rotation of said shaft and engageable with the other driven means to effect counterclockwise rotation of said shaft, a prime mover for propelling said driving means, throttle means for said prime mover having a fixed speed setting and an idling speed setting, a speed responsive clutch disposed between said prime mover and said driving means, brake means associated with the driven means, brake means having an applied and a released position, and control means freely movable between forward, reverse, and neutral positions, said control means in the forward position effecting engagement of the driving means with one of the driven means, adjusting the throttle to said preselected fixed speed setting and moving the brake to its released position, said control means in the reverse position effecting engagement of the driving means with the other driven means, adjusting the throttle to said preselected fixed speed setting and moving the brake to the released position, said control means in the neutral position moving the driving means between the driven means and out of engagement therewith, moving the throttle to its idling speed setting and moving the brake to its applied position.

HARRY W. LIND.

REFERENCES CITED

The following references are of record in the file of this patent:

UNITED STATES PATENTS

| Number | Name | Date |
|---|---|---|
| 496,053 | Fullerton | Apr. 25, 1893 |
| 688,838 | Dorsey | Dec. 17, 1901 |
| 928,739 | Cole | July 20, 1909 |
| 1,403,390 | Cameron | Jan. 10, 1922 |
| 1,764,851 | Polm | June 17, 1930 |
| 1,814,566 | Lombard | July 14, 1931 |
| 1,873,458 | Murnane | Aug. 23, 1932 |
| 2,027,844 | Sholfield | Jan. 14, 1936 |
| 2,166,450 | Smalley | July 18, 1939 |
| 2,171,715 | Sinclair | Sept. 5, 1939 |
| 2,228,917 | Walls | Jan. 14, 1941 |
| 2,257,674 | Dunn | Sept. 30, 1941 |
| 2,258,627 | Siesennop | Oct. 14, 1941 |
| 2,333,682 | Schneider | Nov. 9, 1943 |
| 2,387,370 | Wallace | Oct. 23, 1945 |
| 2,433,709 | Rogers | Dec. 30, 1947 |
| 2,445,058 | Fields | July 13, 1948 |
| 2,452,008 | Wickwire | Oct. 19, 1948 |
| 2,526,435 | Teigman | Oct. 17, 1950 |

FOREIGN PATENTS

| Number | Country | Date |
|---|---|---|
| 184,568 | Great Britain | Aug. 17, 1922 |
| 141,191 | Germany | Mar. 25, 1935 |